United States Patent [19]

Coatney

[11] 3,954,488

[45] May 4, 1976

[54] PLASTICALLY DEFORMABLE MAGNESIA

[75] Inventor: Richard L. Coatney, Pleasanton, Calif.

[73] Assignee: Kaiser Aluminum & Chemical Corporation, Oakland, Calif.

[22] Filed: Mar. 19, 1975

[21] Appl. No.: 559,947

[52] U.S. Cl. .................................. 106/62; 106/58; 106/60
[51] Int. Cl.² .................. C04B 35/04; C04B 35/44
[58] Field of Search ...................... 106/58, 62, 60; 264/332

[56] References Cited

UNITED STATES PATENTS

| | | | |
|---|---|---|---|
| 2,999,759 | 9/1961 | Hever | 106/58 |
| 3,666,851 | 5/1972 | Chaklader | 264/332 |
| 3,676,079 | 7/1972 | Morgan | 264/332 |
| 3,713,855 | 1/1973 | Wright | 106/58 |
| 3,754,951 | 8/1973 | Coatney | 106/58 |
| 3,833,390 | 9/1974 | Staut et al. | 106/58 |
| 3,852,080 | 12/1974 | Davies et al. | 106/58 |

FOREIGN PATENTS OR APPLICATIONS 1,062,891  3/1967  United Kingdom .................. 106/58

Primary Examiner—Helen M. McCarthy
Attorney, Agent, or Firm—Paul E. Calrow; Malcolm McQuarrie

[57] ABSTRACT

A composition capable of being plastically deformed at high temperatures contains at least 98% MgO, less than 0.1% $B_2O_3$, and, as principal subsidiary components, CaO, $SiO_2$, and $Al_2O_3$. Based on the total weight of the subsidiary components, there is about 65% CaO, from 25 to 33% $SiO_2$, and from 10 to 2% $Al_2O_3$. The composition is preferably substantially free of iron, but in any case the weight of $Fe_2O_3$ is no more than one-tenth the weight of $Al_2O_3$.

9 Claims, No Drawings

PLASTICALLY DEFORMABLE MAGNESIA

BACKGROUND OF THE INVENTION

This invention concerns magnesia ceramic compositions, and particularly such compositions which are plastically deformable at high temperatures.

The plastic deformation method of shaping is well known. It is used, for example, to form objects from wet clay, as by throwing on a potter's wheel. It is also known to plastically form metals, either at room temperature or at elevated temperatures, for example by extrusion or forging.

The essential rheological feature of material which can be plastically formed is the presence of a yield point. This is a stress below which the material will not permanently deform, but above which it will do so, but without rupturing. In plastic forming, the material is subjected to a stress above its yield point to form it into the desired shape, it will then maintain its new shape under the effect of stresses below the yield point. For example, a shape newly formed from plastic clay resists deformation under the force of gravity.

For many years material technologists have been searching for refractory materials (i.e., materials which can be used for structural elements operating at elevated temperatures, for example in molten metal processing apparatus) which will plastically deform, but which will hold their new shape, particularly at elevated temperatures.

The present invention provides a magnesia (MgO) ceramic composition which can be plastically deformed without rupturing at elevated temperatures.

SUMMARY OF THE INVENTION

It has now been discovered, according to this invention, that a magnesia composition is plastically deformable at elevated temperatures when it consists essentially of at least 98% MgO, less than 0.1% $B_2O_3$, the remainder being subsidiary components which are predominantly CaO, $SiO_2$, and $Al_2O_3$, wherein the subsidiary components are about 65% CaO, from 25 to 33% $SiO_2$, and from 10% to 2% $Al_2O_3$, any $Fe_2O_3$ present being no more than one-tenth the amount by weight of $Al_2O_3$, all percentages being by weight and the percentages of CaO, $SiO_2$, and $Al_2O_3$ being based on the total weight of subsidiary components.

DETAILED DESCRIPTION

Magnesia (MgO) may be obtained from any of several well known sources. For example, it may be produced from sea water or inland brines by reacting the magnesium chloride in such brines with lime, for example calcined dolomite or calcined limestone. Such a magnesia may contain the subsidiary components in the requisite proportions for use directly to produce a composition according to the present invention. However, it is much more likely that the amounts of the subsidiary components will have to be adjusted, for example by adding $SiO_2$ and/or CaO to the magnesia produced from the brine. One of the critical features of the present invention is the very low amount of iron in the composition. It may prove difficult to produce a magnesia with the requisite low iron content by the brine process.

Thus, it may prove more convenient to produce the composition of this invention by starting with a raw material which contains substantially all (e.g., 99.9% or more) MgO, or a material which will yield that purity MgO upon calcination, and to add the subsidiary components in the amounts required. Such additions may be made by means of the simple oxides themselves, for example $SiO_2$, or as a material which will yield the desired oxide on firing, for example $CaCO_3$. They may also be added in preacted form, for example as dicalcium silicate and tricalcium aluminate.

As mentioned, the composition must contain less than 0.1%, preferably less than 0.05%, $B_2O_3$. When brine is the source of the magnesia used, it may be necessary to take special steps to reduce the boron to the requisite level, as is well known in the art.

The principal subsidiary components of the composition are CaO, $SiO_2$, and $Al_2O_3$. As discussed below, these are believed to be present mainly as dicalcium silicate ($2CaO.SiO_2$ or $C_2S$) and tricalcium aluminate ($3CaO.Al_2O_3$ or $C_3A$). On the basis of the total subsidiary phases present (i.e., all the material aside from MgO), there is about 65 weight per cent CaO, from 25 to 33% $SiO_2$, and from 10 to 2% $Al_2O_3$.

It will be evident that the amount of the subsidiary components, on the basis of the total composition, will depend on the total amount of MgO present. Thus, for example, if the composition contains 98% MgO, the above percentages for the subsidiary components convert, on the basis of the total composition, to 1.3% CaO, from 0.5 to 0.66% $SiO_2$, and from 0.2 to 0.04% $Al_2O_3$.

More fundamentally, it can be determined from known phase relationships that compositions according to the present invention consist, in the subsidiary phases, of dicalcium silicate and tricalcium aluminate. In fact, the compositions of the examples given below were chosen so as to yield these two phases as the principal subsidiary phases (periclase, of course, being the dominant phase of the composition).

An examination of published phase diagrams pertaining to this composition system indicate that the presence of iron in compositions otherwise according to this invention will lead to the formation of liquids at relatively low temperatures, i.e., at temperatures below 1400°C. Accordingly, it is preferred that compositions according to the present invention be substantially free of $Fe_2O_3$, but in any case the weight of any $Fe_2O_3$ present will be no more than one-tenth the weight of $Al_2O_3$.

EXAMPLES

The compositions shown in Table I were made by taking the amount of chemically pure (99.9% MgO) magnesium oxide (made by reacting chemically pure $MgCl_2$ with NaOH and calcining the resulting $Mg(OH)_2$) shown in Table I and admixing with it, by blending in an acetone slurry, the requisite amounts of silica, calcium carbonate and alumina to provide the amounts of these oxides shown in the Table. The Table also indicates the calculated phases present.

All materials used were of a fineness such that substantially all passed a 325 mesh screen (i.e., all were substantially less than 44 microns in size). The various admixtures were isostatically pressed, at a pressure of 10,000 psi (pounds per square inch), into cylinders about 4 inches long × 1 inch diameter. These were fired at a temperature of 1600°C for 6 hours, producing cylinders about 2½ inches long × 3/4 inch diameter. From these fired cylinders, specimens 0.65 inch long × 0.40 inch diameter were machined. These machined specimens were tested for compressive strength at 1500°C, with the results shown in Table I.

It can be seen that mixes C and D are within the scope of the present invention, whereas the remaining mixes are comparison examples outside the scope of the invention. Mix A is pure MgO, and shows the relatively low strength of that material. Mix B contains 2% dicalcium silicate as the dominant

TABLE I

| Mix | Composition (wt %) | | | | | | | Compressive Strength (psi) at 1500°C | Porosity (Vol %) | Creep rate (% change/hr) | |
|---|---|---|---|---|---|---|---|---|---|---|---|
| | Ultimate Analysis | | | | | Phases | | | | 50 psi | 100 psi |
| | MgO | CaO | SiO$_2$ | Al$_2$O$_3$ | B$_2$O$_3$ | C$_2$S | C$_3$A | | | | |
| A | 100 | — | — | — | 0.004 | — | — | 6,200 | 5.9 | 0.024 | 0.062 |
| B | 98 | 1.30 | 0.70 | — | 0.002 | 2.0 | — | 17,400 | 8.8 | 0.026 | 0.095 |
| C | 98 | 1.30 | 0.64 | 0.06 | 0.01 | 1.83 | 0.17 | 22,900* | 11.9 | 0.026 | 0.116 |
| D | 98 | 1.30 | 0.58 | 0.12 | 0.01 | 1.67 | 0.33 | 23,100* | 12.1 | 0.035 | 0.055 |
| E | 98 | 1.29 | 0.46 | 0.25 | 0.02 | 1.33 | 0.67 | 17,800 | 10.6 | 0.027 | 0.060 |
| F | 98 | 1.27 | 0.35 | 0.38 | 0.06 | 1.00 | 1.00 | 3,600 | 10.3 | — | — |
| G | 98 | 1.24 | — | 0.76 | 0.09 | — | 2.0 | 1,700 | 8.4 | — | — |

*Deformed plastically subsidiary phase, and shows greatly enhanced high temperature strength. Mix G has 2% tricalcium aluminate as the dominant subsidiary phase, and shows very low high temperature strength. Mixes C and D indicate that when tricalcium aluminate is combined with dicalcium silicate in the subsidiary phases, the high strength of Mix B is increased even further. More important, however, is the fact that Mixes C and D deformed plastically under the high stresses applied at 1500°C.

Additional specimens of Mixes A through E, in the form of rods 4.5 inches long and 0.75 inch in diameter (made from 99.7% pure MgO obtained by calcining Morton magnesium basic carbonate), were placed under a longitudinal load of 50 psi and heated at 50°C per hour to 1600°C in a high temperature dilatometer. On reaching the 1600°C soak temperature, the change in length of the specimen with time was recorded on an X-Y recorder. After the first hour (at 1600°C and 50 psi), the stress level was changed to 100 psi, and soaking continued for 4 more hours. The creep rate, expressed as per cent linear change in length per hour, is given in Table I. It can be seen that at these low stresses, and particularly at 50 psi, there was no significant difference in the creep rate between compositions according to this invention, and other compositions which are not plastically deformable at 1500°C. In other words, while the compositions according to this invention can be plastically deformed at 1500°C under stresses over 20,000 psi, when the stress is reduced to a much lower level, they do not show any unusual deformation. In other words, the specimens according to this invention have a yield stress. It may be noted that when the strengths of specimens such as A, B, E, F and G in Table I were determined, the specimens broke brittlely at the stresses shown.

What is claimed is:

1. A fired ceramic plastically deformable at 1500°C under stresses over 20,000 psi and consisting essentially of at least 98% MgO, less than 0.1% impurities other than CaO, SiO$_2$, and Al$_2$O$_3$, the remainder being subsidiary components which are CaO, SiO$_2$, and Al$_2$O$_3$, wherein the subsidiary components are about 65% CaO, from 25 to 33% SiO$_2$, and from 10% to 2% Al$_2$O$_3$, whereby the subsidiary phases are substantially all dicalcium silicate and tricalcium aluminate, all percentages being by weight and the percentages of CaO, SiO$_2$, and Al$_2$O$_3$ being based on the total weight of the subsidiary components.

2. A fired ceramic according to claim 1 containing about 98% MgO.

3. A fired ceramic according to claim 1 containing less than 0.05% B$_2$O$_3$.

4. A fired ceramic according to claim 1 wherein the subsidiary components contain about 30% SiO$_2$ and 5% Al$_2$O$_3$.

5. A fired ceramic according to claim 3 containing about 98% MgO.

6. A fired ceramic according to claim 2 wherein the subsidiary components contain about 30% SiO$_2$ and about 5% Al$_2$O$_3$.

7. A fired ceramic according to claim 4 containing less than 0.05% B$_2$O$_3$.

8. A fired ceramic according to claim 7 containing about 98% MgO.

9. A fired ceramic according to claim 6 containing about 0.01% B$_2$O$_3$.

* * * * *